United States Patent
Albanese et al.

[11] Patent Number: 6,002,768
[45] Date of Patent: Dec. 14, 1999

[54] DISTRIBUTED REGISTRATION AND KEY DISTRIBUTION SYSTEM AND METHOD

[75] Inventors: Andres Albanese, Berkeley, Calif.; Rolf Oppliger, Muri, Switzerland

[73] Assignee: International Computer Science Institute, Berkeley, Calif.

[21] Appl. No.: 08/643,892

[22] Filed: May 7, 1996

[51] Int. Cl.$^6$ .............................. H04K 1/00; H04L 9/00
[52] U.S. Cl. .................................. 380/25; 380/4; 380/30; 380/21
[58] Field of Search ................................. 380/21, 23, 24, 380/25, 30, 4

[56] References Cited

U.S. PATENT DOCUMENTS

| | | | |
|---|---|---|---|
| 4,868,877 | 9/1989 | Fischer | 380/25 |
| 4,888,801 | 12/1989 | Foster et al. | 380/25 |
| 5,005,200 | 4/1991 | Fischer | 380/30 |
| 5,202,921 | 4/1993 | Herzberg et al. | 380/23 |
| 5,214,702 | 5/1993 | Fischer | 380/30 |
| 5,224,163 | 6/1993 | Gasser et al. | 380/30 |
| 5,311,591 | 5/1994 | Fischer | 380/4 |
| 5,745,574 | 4/1998 | Muftic | 380/23 |
| 5,784,463 | 7/1998 | Chen et al. | 380/23 |

Primary Examiner—George Dombroske
Assistant Examiner—Robin Clark
Attorney, Agent, or Firm—Pennie & Edmonds LLP

[57] ABSTRACT

An online conference session management system includes computer sites associated with a conference session holder, a plurality of service providers and a plurality of conference session participants. The conference session holder and each service provider has a respective associated public/private key pair for a specified online conference session. Each service provider is provided with an active participant registration certificate that gives the service provider the authority to register participants of the specified conference session, as well as authority to register other service providers as active participants of the specified conference session by providing those other service providers with respective active participant registration certificates. Each active participant registration certificate is digitally signed by either the conference session holder or one of the service providers using a private key of a public/private key pair unique to the conference session holder or respective service provider. Each active participant registration certificate includes the public key of the public/private key pair unique to the service provider whose authority to register participants is given by that active participant registration certificate. The service providers provide participants of the specified conference session with passive participant registration certificates. Each passive participant registration certificate is digitally signed by a service provider using a private key associated with that service provider. A passive participant registration certificate is validated by verifying the certificate's digital signature with the public key associated with the service provider that provided the passive participant registration certificate, and then validating that service provider's active participant registration certificate.

9 Claims, 4 Drawing Sheets

DISTRIBUTED REGISTRATION AND KEY DISTRIBUTION SYSTEM AND METHOD

The present invention relates generally to digital signature, encryption and encryption key distribution systems, and particularly to a system for distributing authority to register participants in an online conference session or other electronically disseminated communication session to service providers in a decentralized manner, and for enabling service providers to provide certificates of participation in electronic conferences which can be authenticated.

BACKGROUND OF THE INVENTION

An online conference session is defined to be a communication session in which two or more parties communicate electronically. If a conference session is private, participation is restricted, typically using encryption keys (sometimes herein called secret keys) to encrypt the conference session. If a conference session is not private, participation is not restricted. A private conference session always requires participants registration and authentication, whereas a public conference may require either participants' registration, or both participant' registration and authentication. Registration is the procedure by which a participant indicates his/her intention to participate in a conference session and receives in return a registration certificate. For private conferences, registration is also the process by which a participant obtains the secret key required to decode the contents of the conference session. Authentication is the procedure by which a participant's identity is validated.

For example, a scientific conference may be public in nature, but require participants registration for billing purposes. Similarly, it may require authentication for providing membership discounts.

A multi-party communications system allows two or more parties to send and receive data and to communicate accordingly. A conferencing system, is a multi-party communications system that provides real time communications.

An online conferencing system will typically allow several conference sessions to take place simultaneously. Every conference session is assumed to be initiated by a particular user, namely the session holder, and it is up to the session holder to specify the conference type, and to handle participants registration and key distribution accordingly. With regard to participants registration and key distribution, the session can follow either a centralized or distributed approach. In a centralized approach, the session holder handles everything himself, whereas in a distributed approach the session holder nominates agents to assist him. The present invention utilizes a distributed approach.

It is a goal of the present invention to enable a session holder to enlist the services of other parties to facilitate the registration and distribution of secret keys to conference session participants.

It is a further goal of the present invention to provide a mechanism so that registration certificates given to conference session participants can be validated by any user of the system, including parties not participating in the conference session.

It is a further goal of the present invention to provide a mechanism that enables any user of the system to determine if a particular participant has registered for a conference session, who provided that participant with a registration certificate, and provided him with the session key in a private conference session.

It is a further goal of the present invention to enable conference session participants to be able to request specified certification parties, such as universities, to convert their registration certificates into attendance certificates, and for such certification parties to be able to validate the registration certificates so as to verify that the requesting party actually participated in the conference session for which an attendance certificate has been requested.

SUMMARY OF THE INVENTION

In summary, the present invention is an online conference session management system in which there are computer sites associated with a conference session holder, a plurality of service providers and a plurality of conference session participants. The conference session holder and each service provider has a respective associated public/private key pair for a specified online conference session. Each service provider is provided with an active participant registration certificate that gives the service provider the authority to register participants of the specified conference session, as well as authority to register other service providers as active participants of the specified conference session by providing those other service providers with respective active participant registration certificates.

Each active participant registration certificate is digitally signed by either the conference session holder or one of the service providers using a private key of a public/private key pair unique to the conference session holder or respective service provider. Each active participant registration certificate includes the public key of the public/private key pair unique to the service provider whose authority to register participants is given by that active participant registration certificate.

The service providers provide participants of the specified conference session with passive participant registration certificates, where each passive participant registration certificate is digitally signed by a respective one of the service providers using a private key of a public/private key pair unique to the respective service provider.

Any one of the passive participant registration certificates can be validated by any user by verifying the certificate's digital signature with the public key associated with the service provider who provided the passive participant registration certificate, and then validating that service provider's active participant registration certificate by verifying its digital signature with the public key associated with the conference session holder or service provider who provided the session provider's active participant registration certificate. Thus the validation process is recursive and continues until the process reaches a certificate associated with the session holder.

When the specified conference session is a private conference session, the active participant registration certificates and passive participant registration certificates each include a copy of a secret key associated with the private conference session that has been encrypted using a public key associated with the respective active or passive participant to whom the respective active/passive registration certificate was provided. That is, each registration certificate includes an encrypted copy of the private conference session's secret key. At least a portion of the private conference session is transmitted by the session holder in encrypted form, encrypted using the associated secret key.

In a preferred embodiment, conference sessions are lectures held by university professors, and each lecture is sponsored by at least one university. Each sponsoring university issues a sponsor certificate that includes the professors's public key for the lecture and is digitally signed by the university using the private key of a public/private key pair whose public key is well known to be authentic. The sponsor certificates are published by the professor and can be used by any user to ascertain which universities have sponsored a particular lecture. Furthermore, the universities or their proxies, upon request, provide lecture attendance certificates digitally signed by respective ones of the universities to students who have lecture registration certificates that, upon validation, indicate those students attended the corresponding lectures.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

System Overview

Figure 1:
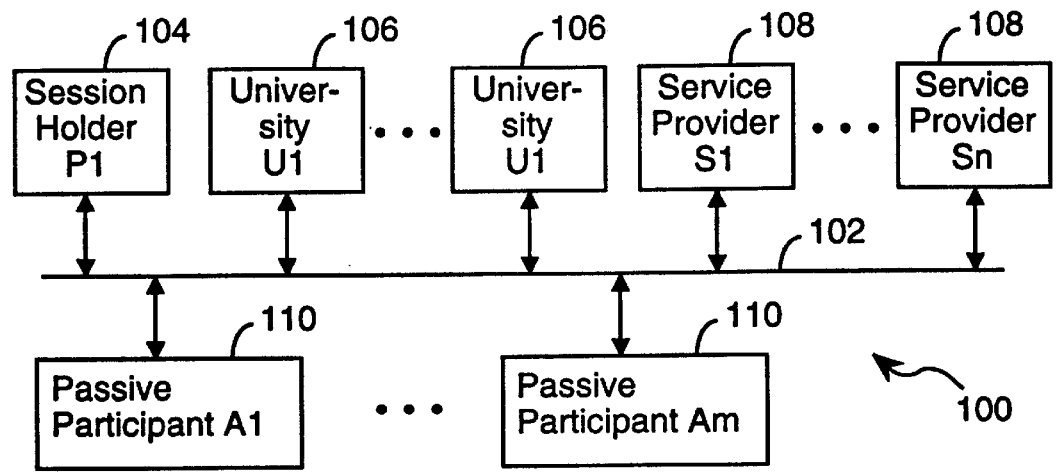
FIG. 1 is a block diagram of a distributed computer system that implements a multimedia conferencing system in accordance with a preferred embodiment of the present invention.

Referring to FIG. 1, an online multimedia conferencing system 100 includes a multicast backbone 102 for transmitting data over multicast channels between the participants of various conferences. While the system 100 can handle multiple online conferences sessions at a time, the invention will be described with reference to a single online conference session.

A typical online conference session utilizing the present invention will include three multicast channels: a video channel, an audio channel, and a registration channel. Another multicast channel may be used as a "whiteboard", e.g., to multicast the slides used in a lecture. Further, there may be several audio or video channels associated with a lecture. In the context of a conference that is a "lecture" presented by a session holder to the other participants, the video and audio channels may be used to carry video and audio signals from the session holder to the other participants. In interactive conferences, video and audio data may be transmitted onto the video and audio channels by more than one of the session participants, either simultaneously or in sequence.

The registration channel of a conference session is used by the participants to transmit various messages related to registering the participants of a conference, distributing encryption keys required for either participating in the conference or for validating the registrations of the participants, and requesting and transmitting conference session attendance certificates, all of which will be described in more detail below.

For reasons that will also be explained below, in the context of the present invention there are four types of conference session participants: a session holder 104, universities (or other trusted certificate issuers) 106, service providers (also called active participants) 108 and passive participants 110. For the purposes of this document, the session holder, universities, service providers and passive participants are defined to be the computer systems associated with the people and entities normally given those designations.

The session holder 104 is the system that initiates and generally controls an online conference session. Universities 106 need not actually participate in a conference session, except to generate various certificates (described below) that are trusted by all the participants to be authentic. Service providers 108 assist the session holder in the registration of other service providers 108 as well as passive participants 110, as well as in the distribution of secret keys required for participation in private conferences.

Figure 2:
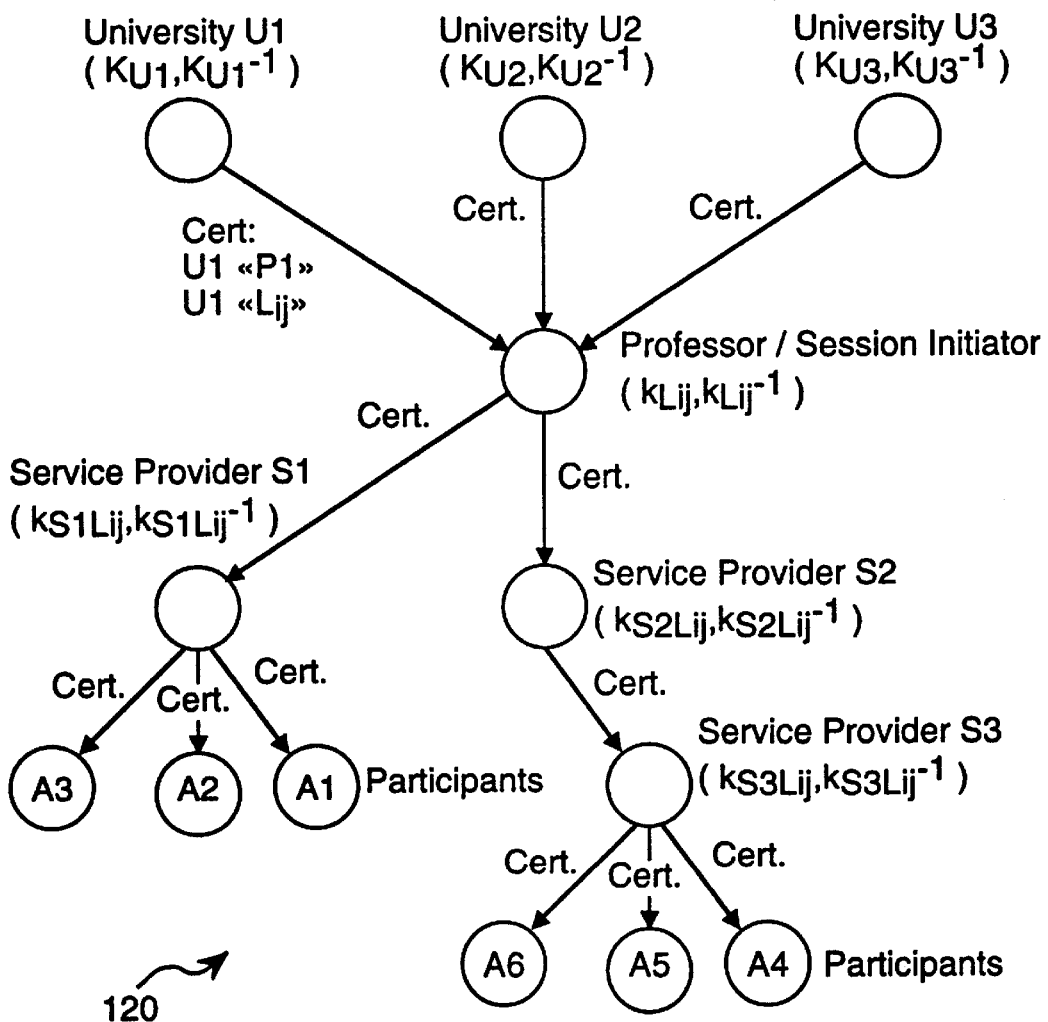
FIG. 2 depicts a participants registration tree (PRT) for a conference session.

FIG. 2 represents a participants registration tree (PRT) 120 for a conference session. The basic scheme for distributing certifications is that certifications flow from the systems at the top of the tree to systems lower in the tree. More specifically, certifications sent from higher level systems to lower level systems are digitally signed using private keys of the respective higher level systems. Thus, a registration certificate generated by the session holder for a service provider are digitally signed by a private key associated with the session holder. In addition, validations of certifications, which is the procedure for determining that a certification associated with a conference session is valid, proceed from lower level systems to higher level systems until the validation procedure encounters a certificate by a system that it trusts. The systems and methods for certification generation, transmission and validation are described in more detail below.

The portion of the participants registration tree 120 that excludes the passive participants is called the active participants registration tree. When a system, such as a computer associated with a university, stores "a copy of the active participants registration tree," what is actually stored are the registration certificates of all the active participants, as well as the conference session announcement by the session holder, which includes all the sponsor certificates issued by the sponsoring universities (as described in more detail below).

Figure 3:
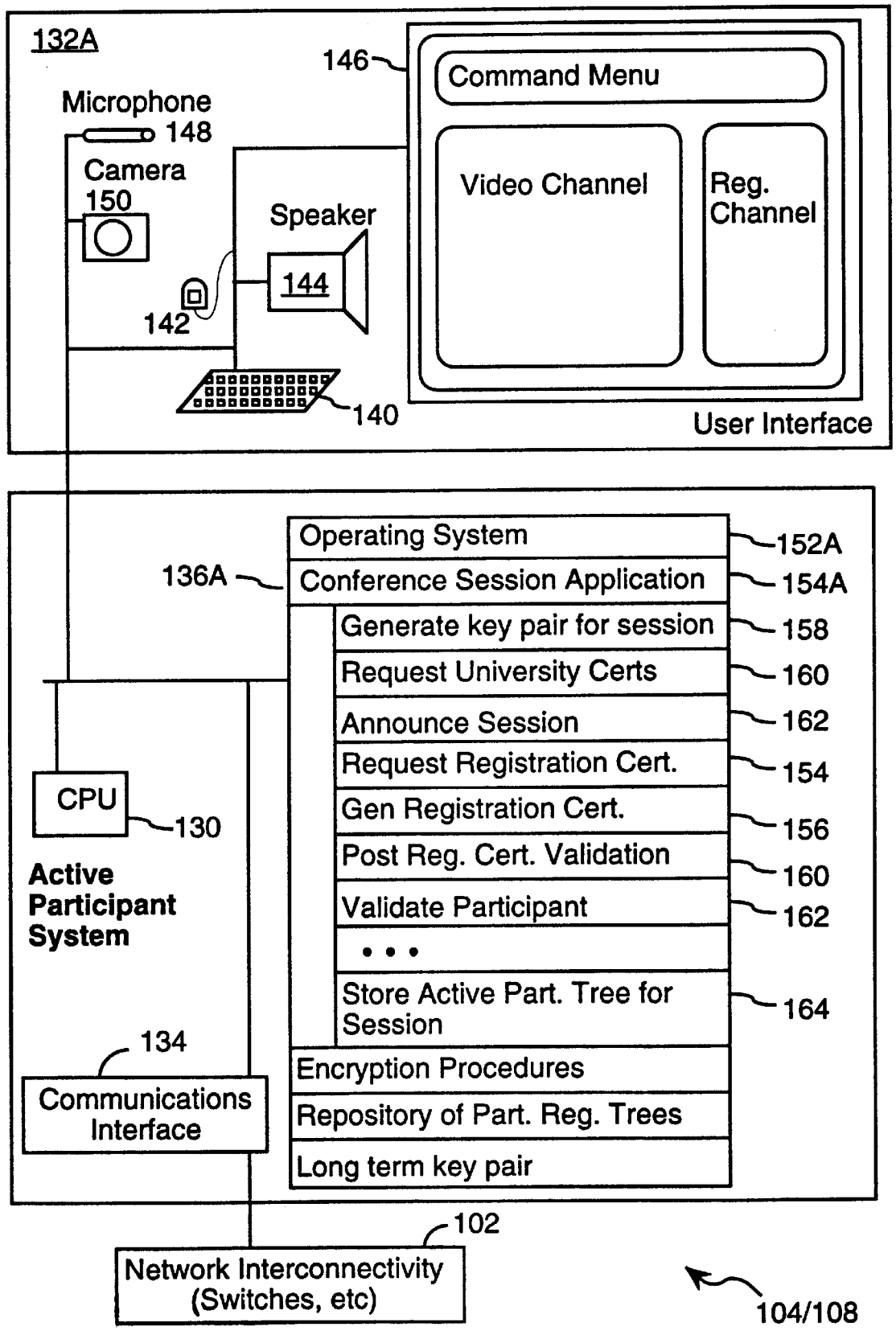
FIG. 3 is a block diagram of a computer system used by an active participant or session holder in the multimedia conferencing system of FIG. 1.
Figure 4:
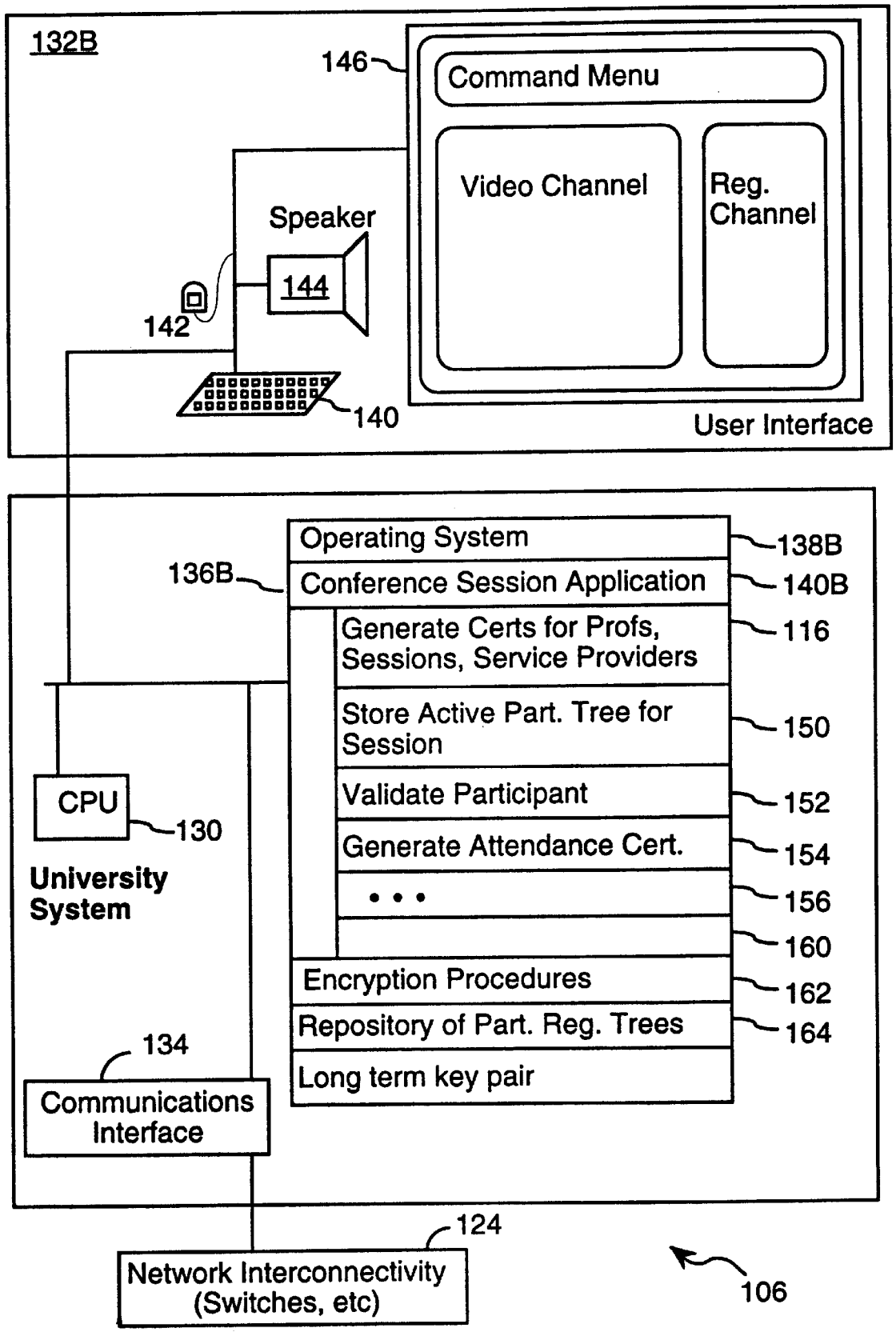
FIG. 4 is a block diagram of a computer system used by a university or other session certifying authority in the multimedia conferencing system of FIG. 1.
Figure 5:
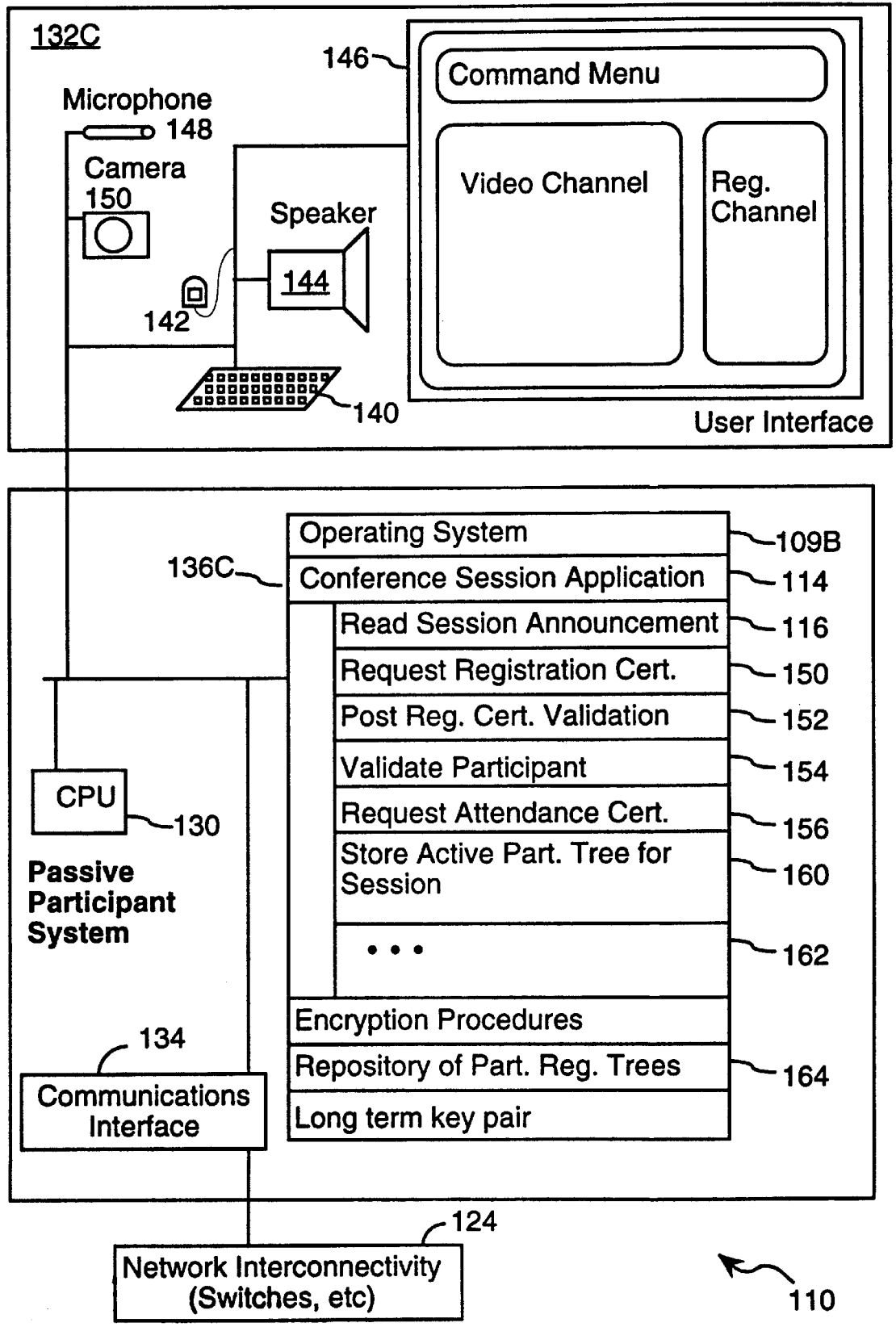
FIG. 5 is a block diagram of a computer system used by an passive participant in the multimedia conferencing system of FIG. 1.

FIGS. 3, 4 and 5 are block diagrams of the computer systems 104/106, 108 and 110 typically used by an active participant (including a session holder), a university, and a passive participant, respectively. Each such system includes a central processing unit 130, a user interface 132, a communications interface 134 for receiving and sending data via the communications network 102, and memory 136 (including both RAM and non-volatile memory). The user interfaces 132 for all the systems will typically include a keyboard 140, pointer device 142, audio speaker 144, and video monitor 146. The user interfaces 132A and 132C for each active and passive participant who will contribute video and audio data to a conference will also include a microphone 148 and camera 150.

The memory 136 of each computer system includes an operating system 152 and a conference session application 154 for controlling that system's participation in conference sessions and in the generation, transmission and handling of various certificates and encryption keys. The procedures provided by each system's conference session application

154 may vary in accordance with the type of conference session participant the system's user is. For instance, a passive participant's computer system does not need to generate registration certificates (or any other type of certificates), and thus need not include: certification generation procedure 156, encryption key pair generation procedure 158, university certification request procedure 160, and conference session announcement procedure 162.

The conference session application procedures mentioned above, as well as the other procedures and data stored in the memories of the computer systems that are shown in the figures will be described below.

Definitions

The present invention distinguishes between active and passive participants in a conference session. Active participants, also called service providers, assist the session holder in participants registration and key distribution. In principal, any user can become an active participant and register new users as active or passive participants on the session holder's behalf. In addition, the active participant can also provide new users with the session key that is necessary to participate in a private conference session. The present invention provides participants registration and key distribution in a decentralized and distributed manner, but still enables the session holder (or any other user of the conferencing system) to determine if a particular participant has registered for a session, who provided that participant with a registration certificate, and provided him with the session key in a private conference session.

While the present invention is applicable to any type of online conference session system in which participants registration and key distribution functions are to be performed, the preferred embodiment of the invention is suitable for use by "online universities," as well as other forms of online education services. Thus conference sessions will be called "lectures" and session holders will be called "professors." However, it should be understood that the present invention is applicable to conference sessions other than university lectures and to session holders other than university professors.

In accordance with the preferred embodiment of the present invention, online universities can use the network infrastructure of various service providers to disseminate interactive lectures to a potentially very wide audience. In general, a university could cooperate with a trusted set of specific service providers. Following this approach would require that the university enter into an agreement with every individual service provider. The service providers would be responsible for the dissemination of the university lectures, as well as for students registration, validation, and certification. The university, in turn, would accept and recognize certificates that are issued by university-registered service providers. This approach is simple and straightforward. However, this approach lacks the flexibility useful, and perhaps necessary, in the context of online universities.

For instance, it would be convenient for a professor to teach the same course at several universities and to have as many service providers as possible disseminating his lectures. The more service providers that participate in lecture dissemination, the more students have the possibility to attend it. Ideally, a professor would not have to deal with every single service provider, but would allow service providers to deal with other service providers on his behalf, too. The present invention allows such a distributed mechanism for disseminate lectures, as well as for handling students registration, validation and certification.

A cryptographic protocol is defined to be protocol that uses cryptography, meaning that all or parts of the messages are encrypted on the sender's side and decrypted on the receiver's side. The following notation is used throughout this document:

$P_i$ is used to refer to professor l ($l \geq 1$); more generally, $P_i$ are session holders;

$L_{ij}$ is used to refer to a particular lecture (conference session) j held by professor l ($l, j \geq 1$). $L_{ij}$ is used to refer to both the lecture and the multicast channel that is associated with and overlayed by lecture $L_{ij}$. This channel may consist of several channels, each of them dedicated to a specific purpose, such as voice or video transmission. In this case, systems using the present invention overlay one of these channels to deal with students registration, validation and certification.

$S_i$ is used to refer to service providers, also known as active participants ($l \geq 1$);

$A_i$ is used to refer to student i ($i \geq 1$);

$U_i$ is used to refer to online university l ($l \geq 1$);

K is used to refer to a secret key, whereas (k, $k^{-1}$) is used to refer to a public key pair, where k is the public key and $k^{-1}$ is the corresponding private key. In either case, key subscripts may be used to refer to the users of the conferencing system. Each participant (university, professor, service provider and student) generally has a long term key pair. In addition, short term keys are created and used for specific conference sessions (i.e., lectures) by professors and service providers.

{m}K is used to refer to a message m that is encrypted with the secret key K. The same key is used for decryption, so {{m}K}K equals m. Similarly, the term {m}k is used to refer to a message m that is encrypted with a public key k. The message can be decrypted only with the corresponding private key $k^{-1}$. In a digital signature system, the user's private key is used to digitally sign messages, whereas the corresponding public key is used to verify the signatures. In this case, the term {m}$k^{-1}$ refers to a digital signature of the entire message, giving message recovery (i.e., where decryption of the digital signature results in recovery of the entire message).

<m>$k^{-1}$ refers to a digital signature "with appendix," and is an abbreviation for m,{h(m)}$k^{-1}$, with m representing the clear text message, and h being a collision-resistant one-way hash function.

X <<Y>> refers to a certificate that has been issued by X for Y's long term public key $k_Y$. In general, this certificate may conform to any standard, such as ITU-T X.509 or Pretty Good Privacy (PGP).

X <Y, S> refers to a registration certificate that has been issued by X for Y and session S. Depending on whether Y has registered as an active participant (i.e., a service provider) or a passive participant (i.e., a student), X <Y, S> abbreviates either <X, Y, S, $k_y$>$k_x^{-1}$ or <X, Y, S<$k_x^{-1}$, where $k_x^{-1}$ is the short term private key created by X for the session S and $k_y$ is the public short term key created by Y for the session S if Y is a service provider. When Y is a passive participant in a private conference, X <Y, S> abbreviates <X, Y, S, $k_y$>$k_x^{-1}$ where $k_y$ is a public key associated with Y, typically a long term public key used by Y for public key encryption.

$U_m$ <<Y, S>> denotes a university issued lecture attendance certificate (LAC) for participant (student) Y in session (lecture) S, where $U_m <<Y, S>>$ abbreviates $<U_m, Y, S>k_{Um}^{-1}$ where $k_{Um}^{-1}$ is the long term private key of the issuing university.

The Methodology of the Preferred Embodiments

Each university $U_i$ has a long term public key pair written here as $(k_{Ui}, k_{Ui}^{-1})$, of which $k_{Ui}$ is publicly available (i.e., it is the public key of the key pair) and $k_{Ui}^{-1}$ is kept secret (i.e., it is the private key of the key pair). It is also assumed for the purposes of this document that certificates signed by at least some universities are generally trusted, while certificates signed by other entities are not automatically trusted.

Similarly, it is assumed that every professor $P_i$ and every service provider $S_i$ holds a long term key pair $(k_{Pi}, k_{Pi}^{-1})$ and $(k_{Si}, k_{Si}^{-1})$, respectively, of which the public keys $k_{Pi}$ and $k_{Si}$ are publicly available, but not generally trusted by everybody. Furthermore, it is assumed that all passive participants in private conference sessions also hold a long term key pair $(k_{Ai}, k_{Ai}^{-1})$.

If a professor $P_i$ or a service provider $S_i$ wants his (its) public key to be used, he (it) has to provide a corresponding certificate from a trusted source, such as a university. In particular, in the context of the preferred embodiment, the professor $P_i$ or service provider $S_i$ must provide a certificate $U_i <<P_i>>$ or $U_i <<S_i>>$ issued by one of the universities for public key of the professor $P_i$ or service provider $S_i$.

The private key of a university is used to digitally sign certificates and other messages, while the public key is used by other persons and entities to verify that the certificate or message was in fact issued by the university. The university's public key is available to all requesters from a trusted source, such as the university itself, or a secure and trusted repository of public keys.

Conference Session (Lecture) Initialization

If the professor wants to hold a lecture $L_{ij}$, he randomly selects a public key pair $(k_{Lij}, k_{Lij}^{-1})$ for the lecture $L_{ij}$, and asks various universities, such as $U_1$, $U_2$ and $U_3$ to "sponsor" the lecture. When a university $U_k$ sponsors a lecture, that means that university $U_k$ recognizes professor $P_i$ as the official professor for the lecture $L_{ij}$ on the one hand, and that professor $P_i$ accepts university $U_k$ as a certificate issuing authority for lecture $L_{ij}$ on the other hand. As a result of the sponsoring agreement, the sponsoring university $U_k$ provides the sponsored professor $P_i$ with a first certificate $U_k <<P_i>>$ for the professor $P_i$'s long term public key $k_{pi}$, and a second certificate $U_k <<L_{ij}>>$ for the lecture $L_{ij}$'s public key $k_{Lij}$.

Each of these certifications will typically include the following information (or fields):

- name of the university;
- name of the professor;
- the professor's long term public key, or the lecture's public key (depending on which certificate we are talking about);
- for the certificate for the lecture: the name of the course and lecture to which the certification applies;
- a timestamp or other value which uniquely identifies the certificate; and
- a digital signature generated by encrypting the other fields of the certificate with the university's private key.

There is no restriction with regard to having multiple sponsors, and thus a professor may have several sponsors, and several sets of corresponding certificates for any particular lecture, and further may have different sets of sponsors for different lectures.

The Professor then begins the processing of signing up one or more service providers, also called authorized distributors, by publishing an announcement of the lecture $L_{ij}$. The announcement basically consists of the professor $P_i$'s and the lecture $L_{ij}$'s identifiers, the sets of sponsor certificates $\{U_k <<P_i>>\}$ and $\{U_k <<L_{ij}>>\}$, and a digital signature that professor $P_i$ generates with his long term private key $k_{Pi}^{-1}$. Thus, together with a general description of the lecture $L_{ij}$, professor $P_i$ makes publicly available the expression (sometimes called the conference session announcement):

$$<P_i, L_{ij}, \{U_k <<P_i>>\}, \{U_k <<L_{ij}>>\} >k_{Pi}^{-1}.$$

Anybody who receives this expression can use one of the sponsor certificates in $\{U_k <<P_i>>\}$ to extract professor $P_i$'s public key $k_{Pi}$, and apply this key to verify the digital signature in the expression. If the signature is valid, the announcement is considered to be authentic, and the lecture's short term public key $k_{Lij}$ can then be extracted from one of the certificates $\{U_k <<L_{ij}>>\}$ accordingly. Note, however, that in order to extract $k_{Pi}$ and $k_{Lij}$, at least one university in the corresponding sponsor certificate sets $\{U_k <<P_i>>\}$ and $\{U_k <<L_{ij}>>\}$ must be trusted. To maximize this probability, professor $P_i$ makes publicly available all sponsor certificates that he holds for the announced lecture $L_{ij}$.

Registration of Service Providers and Students

Having initialized and announced lecture $L_{ij}$ as described above, professor $P_i$ is considered to be the first active participant of lecture $L_{ij}$. It is now up to the service providers to register as active participants of the lecture, and students to register as passive participants for the lecture $L_{ij}$.

In general, the service providers $S_n$ who register as active participants will also have certificates from at least some of the universities $U_k$ that are sponsoring the lecture. When a service provider $S_n$ wants to register as an active participant, he randomly selects a short term public key pair $(k_{nij}, k_{nij}^{-1})$ for the lecture $L_{ij}$, and sends a corresponding registration request to the lecture $L_{ij}$ (i.e., to the conference session):

$$S_n \rightarrow L_{ij}: \text{Reg\_Req} (<S_n, \{U_x <<S_n>>\}, k_{nij}> k_n^{-1}).$$

The registration request is digitally signed using the service provider's long term private key $k_n^{-1}$, while the corresponding public key is authenticated by the university certificates $\{U_x <<S_n>>\}$. The set of service providers who participate as active participants in any particular lecture need not be predetermined, and may be dynamically determined in accordance with which service providers are willing and able to participate at the time the lecture is held.

When a student $A_n$ wants to register as a passive participant in the lecture $L_{ij}$, he sends a corresponding registration request to the lecture:

$$A_n \rightarrow L_{ij}: \text{Reg\_Req} (A_n, [k_n^{-1}])$$

If a lecture is to be a private session, then a student needs to include in the registration request its long term public key $k_n$, or any other public key it has available. Otherwise a student's registration request need not include a public key.

In an alternate embodiment, the student registration request may include in the registration request the identifier of the service provider $S_i$ from which the student wants to receive a registration confirmation, as well as the identifier of the university from which the student wants to receive a lecture attendance certificate at the conclusion of the conference. Student selection of the service provider $S_i$ may be based on which universities the registered service providers have certificates from, or on which service provider or providers the student has pre-established accounts for payment of lecture registration fees.

In either case, the registration request can be grabbed by any active participant of the lecture $L_{ij}$. In principle, an active participant $S_m$ confirms a requesting service provider $S_n$ or student $A_n$ by sending a registration confirmation to the lecture $L_{ij}$ $$S_m \to L_{ij}: \text{Reg\_Conf} (<S_n, S_m <S_n, L_{ij}>, [\{K_S\}k_{nij}])$$

in response to a request to register as an active participant, or $$S_m \to L_{ij}: \text{Reg\_Conf} (<A_n, S_m <A_n, L_{ij}>, [\{K_S\}k_n])$$

in response to a request to register as a passive participant. The registration confirmation includes a registration certificate $S_m <S_n, L_{ij}>$ or $S_m <A_n, L_{ij}>$ that identifies the lecture and the party being registered and is digitally signed by the registering service provider with that service provider's short term private key for the lecture.

The service provider must verify the identity of the student (or other registration certification requester) prior to issuing a registration certificate to the student, using any locally available identification methodology. This "participant identity verification" may be important because lecture attendance certificates are issued by universities (as will be described below) based on the student identifications in each student's registration certificate. For this reason, universities may choose to accept registration certificates only from service providers known by the university.

If the lecture is a private conference session, then the confirmation message additionally includes $\{K_S\}k_{S_n}$, the session key $K_S$ encrypted with a public key provided by the requester in its registration request. Since only the requester knows the corresponding private key (written as $k_{nij}^{-1}$ in the case of a service provider), only the requester will be able to obtain the session key from the confirmation message.

In general, it is assumed that a previously registered service provider (i.e., active participant) $S_m$ will register another service provider $S_n$ if there exists a commercial relationship between them. Similarly, it is assumed that a registered service provider $S_m$ will register a student $A_n$ if the student $A_n$ is a registered user with the service provider $S_m$ and the student has an account that can be charged for billing purposes. If the service provider $S_m$ registers the student $A_n$ for lecture $L_{ij}$, the student $A_n$'s account is charged with the corresponding registration fees. The service provider $S_m$ holds back a certain percentage of the fees, and returns the rest to the active participant that has registered him. Again, this participant holds back a certain percentage of the fees, and returns the rest to the active participant that has registered him. This continues until the remaining fees reach the professor $P_i$. Note that because of this back propagation of registration fees, service providers have a general interest in registering as many service providers and students as possible.

In an alternate scheme, students are charged little or nothing for registering to participate in a lecture, but are later charged a fee by a university when and if they request a lecture attendance certificate. At that time the university disburses pre-arranged portions of the lecture attendance certificate fee to the service provider that registered the student for the lecture and to the professor who gave the lecture. Optionally, the service providers in the participants registration tree between that service provider and the lecturer, if any, will also receive pre-arranged portions of the lecture attendance certificate fee. In this way students are charged little or nothing for "auditing" a lecture without attending it for course credit, but are charged for attending a lecture for which attendance or course credit is obtained.

If the confidentiality of a lecture must be protected, the lecture is encrypted prior to its transmission onto the distribution channel. In accordance with the present invention, the session key for decrypting the lecture is distributed to registered participants (via the lecture's registration channel) as part of the registration confirmation message. In some implementations an individual session key may be required for each channel used by the lecture.

Validation of Registered Participants

The objective of students validation is to distinguish between registered and non-registered students with regard to a particular lecture. Students validation is useful for professors who hold lectures, as well as online universities. In the preferred embodiment, students and service providers periodically send registration validation messages to the multicast "registration" channel that is associated with the lecture.

While each conference session (lecture) has several communication channels, the conference session need not provide a "bulletin board" or any other facility for storing participants registration information. While such a bulletin board would be convenience, if all users depended on it, failure of the bullet board would prevent any registration certificates from being validated. For this reason, storage of the active participants tree is handled separately by each user in the preferred embodiment. It is therefore important that at least the service providers transmit their registration validation messages to the multicast "registration" channel on a regular basis (e.g., every few minutes) so that other users can receive and store copies of the active participants' registration certificates. All users who know that they may want to validate the registration certificates of a conference session set their conference session control application 154 to store a copy of each of the registration certificates in the registration validation messages posted by all active participants. That is, such users store a private copy 164 of the active participants registration tree. Any passive participant who does not want to validate the registration certificates of other participants, but wants to ensure that other users (e.g., universities) will be able to validate its own registration certificate, will set up their conference session application 154C to store at least that part of the active participants registration tree that connects themselves to the session holder.

The registration validation messages basically consist of an identifier of the participant $S_n$ or $A_n$, the participant's registration certificate $S_m <A_n, L_{ij}>$ or $S_m <S_n, L_{ij}>$, and a digitally signed timestamp $\{T_1\}k_{nij}^{-1}$ in the case of service providers (active participants):

$$X_n \to L_{ij}: \text{Reg\_Val} (X_n, S_m <X_n, L_{ij}>, [\{T_1\}k_{nij}^{-1}])$$

where $X_n$ represents $S_n$ for active participants and $A_n$ for passive participants. The timestamp expression is not transmitted for passive participants.

If the sender of the validation message is a passive participant, $S_m <X_n, L_{ij}>$ abbreviates $<S_m, A_n, L_{ij}>k_{mij}^{-1}$. In this case, the passive participant $A_n$'s registration certificate can be validated by any other session participant C only by using the certificate issuer $S_m$'s public key $k_{mij}$. While the certificate issuer $S_m$'s public key $k_{mij}$ can be extracted from the certificate issuer's registration certificate (which, in turn, is periodically transmitted on the lecture session's registration channel), the authenticity of that key can be determined only by validating the registration certificate of the certificate issuer. Generally speaking, the registration validation of a passive participant always requires the registration validation of the active participant that actually registered him.

If the sender of the validation message is an active participant, $S_m <X_n, L_{ij}>$ abbreviates $<S_m, S_n, L_{ij}, k_{nij}>k_{mij}^{-1}$. In this case, the active participant $S_n$'s registration certificate can be validated by any other session participant or system user C by extracting the active participant $S_n$'s session public key $k_{nij}$ from the registration certificate, decrypting the timestamp $T_1$ with $k_{nij}$, and comparing the result with the a timestamp $T_2$ that user C obtains from his local clock. If the difference between $T_1$ and $T_2$ is less than or equal to a certain threshold value, C assumes the registration validation request of $S_n$ to be fresh. Next, the user C needs to validate the active participant $S_n$'s registration certificate. It is noted that this validation scheme requires globally synchronized clocks, although the synchronization can be fairly loose (e.g., within a minute) if the threshold for freshness is correspondingly relaxed.

Note that if C simply extracts the session public key $k_{nij}$ from the registration certificate, he can't be sure that the extracted key is indeed $S_n$'s key. To make sure that key is authentic, C has to verify the digital signature that is associated with $S_m <X_n, L_{ij}>$, too. But to verify that digital signature, which is equal to $<S_m, S_n, L_{ij}, k_{nij}>k_{mij}^{-1}$, C must have $S_m$'s short term public key for the lecture (i.e., the short term public key of the party that issued $S_n$'s registration certificate). C can extract $k_{mij}$ from $S_m$'s registration validation message (which contains a copy of $S_m$'s registration certificate), but again, to make sure that the $S_m$'s short term public key for the session is authentic, he must verify the digital signature that is associated with this message. This chain continues, until C reaches a public key that is certified with the private key of a trusted source (such as a trusted university). The corresponding public key has been published and is assumed to be authentic.

Thus, the validation of a student's participation in a lecture requires validation of every service provider in the certification path from the student up to the professor.

Student Certification

Lecture attendance is often a necessary condition to get admission to an examination. It is assumed that a similar approach must be adapted in online universities, too, and that student certification may provide proof of lecture attendance. Student certification is provided by providing registered students (i.e., registered for a particular lecture) with a lecture attendance certificate (LAC) that, in principle, is issued and digitally signed by a lecture sponsoring university.

Registered students already have a certificate, namely their lecture registration certificate. However, this certificate is valid only for the duration of a lecture, and may become useless after the lecture's termination. Consequently a procedure is required to change a temporary lecture registration certificate into a lecture attendance certificate. At the end of a lecture $L_{ij}$, a student $A_n$ either has to interactively contact a sponsoring university $U_x$ of $L_{ij}$ to be provided with this attendance certificate, or to send a corresponding request to the registration channel that is associated with the lecture:

$$A_n \rightarrow L_{ij}: \text{LAC\_Req}(A_n, U_x, S_m<A_n, L_{ij}>)$$

were $U_x$ identifies the sponsoring university from which student $A_n$ is requesting a lecture attendance certificate (LAC). Alternately, $U_x$ could be a set of universities from which the student is able to accept certificates.

Before issuing a lecture attendance certificate, the university has to validate the registration of the requesting student. In order to perform this validation, the university will need copies of the lecture registration certificates of all the active session participants between the requesting student and the professor in the participants registration tree for the lecture. Thus, in order to perform registration certificate validations, the university, or a proxy service such as a trusted service provider, stores for each lecture that the university has sponsored a copy of the portion of the top portion of participants registration tree, in particular the active participants registration tree. Using that copy of the active participants registration tree, the university or its proxy (e.g., a notary service) validates the requester's registration certificate and the registration certificates of active participants at successively higher tree positions until a certificate is found that has been signed using a key that the university knows to be authentic.

After validating the student's registration certificate, it then posts the lecture attendance certificate:

$$U_x \rightarrow L_{ij}: \text{LAC\_Conf}(U_x <<A_n, L_{ij}>>)$$

The student copies the attendance certificate from the lecture session and stores it for later use. In particular, when the student wants to obtain official course credit for attending all the lectures of a course, or wants to gain admission to the course's final exam, the student presents to the university the student's attendance certificates for all the lectures associated with the course. Validation of the attendance certificates by the issuing university will generally be a precondition for granting the student's request for course credit and/or admission to the final examination.

Session Rekeying

The participants of a private conference session can extract the session key from their registration certificate. However, it is usually good practice to periodically change a session key. The present invention provides three different session rekeying protocols: a full rekeying protocol, a selective session rekeying protocol, as well as a distributed session rekeying protocol.

Full Session Rekeying

If an active participant A with the appropriate rekeying authority (determined by prior agreements among the session's active participants) wants to fully rekey a private session S, he randomly selects a new session key $K'_s$, and runs the following full session rekeying protocol:

$$A \rightarrow S: \text{Full\_Session\_Rekey}(<\{T, K'_s\}K_S>k_a^{-1})$$

where $K_S$ is the current session key and T specifies the time to execute the key change. The protocol consists of a single message that A sends to S. T and the new session key $K'_s$ are both encrypted with the current session key, and digitally signed with the active participant A's short term private key $k_a^{-1}$ for the session.

Every user of the session can learn the active participant's short term public key $k_a$ from the active participant's registration certificate (which is contained in the active participant's periodically transmitted certificate validation), and can verify the digital signature on the rekeying message, but only participants of the session S know the current session key $K_S$ and can decrypt the message accordingly. The full session rekeying protocol does not allow specified participants to be excluded from receiving the new session key.

Selective Session Rekeying

If an active participant A with the appropriate rekeying authority wants to selectively rekey a session S, he randomly selects a new session key $K'_s$, and runs the following selective session rekeying protocol:

A→S: Selective_Session_Rekey(<{T, B, {$K'_s$}$k_b$, C, {$K'_s$}$k_c$, . . . >$k_a^{-1}$)

where T specifies the time to execute the key change and {$K'_s$}$k_i$ carries the new session key for participant i, encrypted with participant i's public key (i.e., the public key included in the participant's registration certificate). The message is digitally signed with the active participant A's short term private key $k_a^{-1}$ for the session.

The set of pairs (B, {$K'_s$}$k_b$) in the selective session rekeying message each provide one specific participant with the new session key. In particular, participant B can decrypt {$K'_s$}$k_b$ with his private key $k_b^{-1}$. The selective session rekeying protocol allows only specified participants to receive the new session key, since the non-specified participants will be unable to decrypt any of the encrypted copies of the new session key.

Distributed Session Rekeying

If an active participant A with the appropriate rekeying authority wants to rekey a session S in a distributed way, he randomly selects a new session key $K'_s$, and runs the following distributed session rekeying protocol:

```
1:   A → S: Distributed_Session_Rekey(<{T, N, PRL}K_S>k_a^-1
2:   B → S: DSR_REQ({{N}k_b^-1}K_S)
3:   X → S: DSR_CONF({B, N{K'_s}k_b}K_S)
```

In step 1, A sends a distribute session rekey (DSR) message to the session on the session's registration channel. The message includes a timestamp T that specifies a time to execute the key change, a nonce N, and a participation revocation list (PRL). The PRL enumerates the participants that are not allowed to received the new session key. The message is both encrypted with the old session key $K_S$, and digitally signed with A's private key $k_a^{-1}$.

After having received the DSR message, it is up to participant B to send a distributed session rekeying request (DSR_REQ) message to the session S in step 2. The DSR_REQ message includes {{N}$k_b^{-1}$}$K_S$, which is the nonce digitally signed with B's private key $k_b^{-1}$ and encrypted with the session's current secret key $K_S$. The DSR_REQ message can be grabbed by any participant X who is already equipped with the new session key $K'_s$.

X validates the registration of B and makes sure that B is not enumerated in the PRL before he returns a distributed session rekey confirmation (DSR_CONF) message to the session in step 3. The DSR_CONF message includes B, N and {$K'_s$}$k_b$, which is the new session key $K'_s$ encrypted with B's public key $k_b$. In addition to that, the message is also encrypted with the current secret session key $K_S$. Consequently, B must have both $K_S$ and $k_b^{-1}$ to successfully decrypt and extract the new session key $K'_s$.

While the general rekey protocols have been described in a way that indicates an active participant A can initiate rekeying, in practice it might be more appropriate to set up a security policy that is more restrictive and to allow only the session holder to actually rekey a session. In this case, the private key $k_a^{-1}$ that is used to digitally sign the initiating session rekey messages must be the master key of the session.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method of distributing electronic registration certificates to electronic online conference session participants, comprising the steps of:

providing a first service provider who is a conference session holder with a public/private key pair for a specified conference session;

providing a plurality of other service providers with active participant registration certificates that give said service providers authority to register participants of said specified conference session, as well as authority to register additional service providers as active participants of said specified conference session by providing said additional service providers with respective active participant registration certificates;

where each active participant registration certificate is digitally signed by either said conference session holder or one of said service providers using a private key of a public/private key pair unique to said conference session holder or respective service provider; each active participant registration certificate including the public key of said public/private key pair unique to the service provider whose authority to register participants is given by said each active participant registration certificate;

said service providers providing participants of said specified conference session with passive participant registration certificates, where each passive participant registration certificate is digitally signed by a respective one of said service providers using a private key of a public/private key pair unique to said respective service provider; and validating any one of said passive participant registration certificates by verifying its digital signature with the public key associated with the service provider who provided said one passive participant registration certificate, and validating that service provider's active participant registration certificate by verifying its digital signature with the public key associated with the conference session holder or service provider who provided said service provider's active participant registration certificate;

wherein said conference session holder receives conference session certificates from one or more certification authorities, each conference session certificate including a public key associated with the conference session holder, where said conference session holder stores a corresponding private key for digitally signing said active participant registration certificates provided by said conference session holder to said service providers; and when any one of said passive participants requests an attendance certificate for said specified conference session from one of said certification authorities, said certification authority validates the requesting party's passive participant registration certificate and then generates a corresponding conference session attendance certificate.

2. The method of claim 1, when said conference session is a private conference session, said active participant registration certificates and passive participant registration certificates each includes a copy of a secret key associated with said private conference session that has been encrypted using a public key associated with the respective active or passive participant to whom the respective active/passive registration certificate was provided;

at least a portion of said private conference session is transmitted by said session holder in encrypted form, encrypted using said associated secret key; and a participant decrypts the portion of the private conference session transmitted in encrypted form using a copy of the secret key generated by decrypting the encrypted secret key in the participant's participant registration certificate with a private key held by the participant, the private key corresponding to the public key with which the secret key was encrypted.

3. A distributed computer system for distributing electronic registration certificates to electronic online conference session participants, the distributed computer system for use in conjunction with a communication channel, the distributed computer system comprising:

a first service provider who is a conference session holder, said conference session holder storing a public/private key pair associated with a specified conference session;

a plurality of other service providers, each having an active participant registration certificate that gives said each service provider authority to register participants of said specified conference session, as well as authority to register additional service providers as active participants of said specified conference session by providing said additional service providers with respective active participant registration certificates;

where each active participant registration certificate is digitally signed by one of said service providers using a private key of a public/private key pair unique to said service provider; each active participant registration certificate including the public key of said public/private key pair unique to the service provider whose authority to register participants is given by said each active participant registration certificate;

said service providers including certificate issuing means for providing participants of said specified conference session with passive participant registration certificates, where each passive participant registration certificate is digitally signed by a respective one of said service providers using a private key of a public/private key pair unique to said respective service provider; and means, coupled to said communication channel, for validating any one of said passive participant registration certificates by verifying its digital signature with the public key associated with the service provider who provided said one passive participant registration certificate, including validating that service provider's active participant registration certificate by verifying its digital signature with the public key associated with the service provider who provided said service provider's active participant registration certificate, and then generating a corresponding conference session attendance certificate.

4. The system of claim 3, wherein, when said conference session is a private conference session, said active participant registration certificates and passive participant registration certificates each includes a copy of a secret key associated with said private conference session that has been encrypted using a public key associated with the respective active or passive participant to whom the respective active/passive registration certificate was provided; and said session holder including means for transmitting at least a portion of said private conference session in encrypted form, encrypted using said associated secret key; and a participant decrypts the portion of the private conference session transmitted in encrypted form using a copy of the secret key generated by decrypting the encrypted secret key in the participant's participant registration certificate with a private key held by the participant, the private key corresponding to the public key with which the secret key was encrypted.

5. The system of claim 3, said conference session holder storing conference session certificates from one or more certification authorities, each conference session certificate including a public key associated with the conference session holder, where said conference session holder further stores a corresponding private key for digitally signing said active participant registration certificates provided by said conference session holder to said service providers.

6. A distributed computer system for distributing electronic registration certificates to electronic online conference session participants, the distributed computer system for use in conjunction with a communication channel, the distributed computer system comprising:

a first service provider who is a conference session holder, said conference session holder storing a public/private key pair associated with a specified conference session;

a plurality of other service providers, each having an active participant registration certificate that gives said each service provider authority to register participants of said specified conference session, as well as authority to register additional service providers as active participants of said specified conference session by providing said additional service providers with respective active participant registration certificates;

where each active participant registration certificate is digitally signed by one of said service providers using a private key of a public/private key pair unique to said service provider; each active participant registration certificate including the public key of said public/private key pair unique to the service provider whose authority to register participants is given by said each active participant registration certificate;

said service providers including certificate issuing means for providing participants of said specified conference session with passive participant registration certificates, where each passive participant registration certificate is digitally signed by a respective one of said service providers using a private key of a public/private key pair unique to said respective service provider; and means, coupled to said communication channel, for validating any one of said passive participant registration certificates by verifying its digital signature with the public key associated with the service provider who provided said one passive participant registration certificate, including validating that service provider's active participant registration certificate by verifying its digital signature with the public key associated with the service provider who provided said service provider's active participant registration certificate;

said conference session holder storing conference session certificates from one or more certification authorities, each conference session certificate including a public key associated with the conference session holder, where said conference session holder further stores a corresponding private key for digitally signing said active participant registration certificates provided by said conference session holder to said service providers;

wherein said certification authorities each include means for responding to a request by any one of said passive participants for an attendance certificate for said specified conference session by validating the requesting party's passive participant registration certificate and then generating a corresponding conference session attendance certificate.

7. A method of operating a service provider participating in electronic online conference sessions, comprising the steps of:

receiving from a conference session holder of a specified conference session an active participant registration certificate that gives said service provider authority to register participants of said specified conference session, as well as authority to register other service providers as active participants of said specified conference session by providing said other service providers with respective active participant registration certificates;

where each active participant registration certificate is digitally signed by one entity selected from the group consisting of said conference session holder and another service provider, using a private key of a public/private key pair unique to said entity; each active participant registration certificate including the public key of said public/private key pair unique to the service provider whose authority to register participants is given by said each active participant registration certificate;

providing participants of said specified conference session with passive participant registration certificates, where each passive participant registration certificate is digitally signed by said service provider using a private key of a public/private key pair unique to said service provider; and validating any one of said passive participant registration certificates by verifying its digital signature with the public key associated with the service provider who provided said one passive participant registration certificate, and validating that service provider's active participant registration certificate by verifying its digital signature with the public key associated with the entity that provided said service provider's active participant registration certificate, and then generating a corresponding conference session attendance certificate.

8. A computer program product for use in conjunction with a set of networked computer systems, the computer program product comprising a computer readable storage medium and a computer program mechanism embedded therein, the computer program mechanism comprising:

a first service provider module, for use by a first service provider who is a conference session holder, the first service provider module including instructions for storing a public/private key pair associated with a specified conference session;

a second service provider module, for use by service providers other than the conference session holder, the second service provide module including instructions that enable a service provide to store an active participant registration certificate that gives an associated service provider authority to register participants of the specified conference session, as well as authority to register additional service providers as active participants of the specified conference session by providing the additional service providers with respective active participant registration certificates;

the first and second service provide modules including instructions for digitally signing an active participant registration certificate using a private key of a public/private key pair unique to an associated service provider; each active participant registration certificate including the public key of the public/private key pair unique to the service provider whose authority to register participants is given by that service provider's active participant registration certificate;

the first and second service provider modules including instructions for issuing passive participant registration certificates to participants of the specified conference session, where each passive participant registration certificate is digitally signed by a respective one of the service providers using a private key of a public/private key pair unique to the respective service provider;

the first service provider module including instructions for storing conference session certificates from one or more certification authorities, each conference session certificate including a public key associated with the conference session holder, where the conference session holder further stores a corresponding private key for digitally signing the active participant registration certificates provided by the conference session holder to the service providers;

a validation module for validating any one of the passive participant registration certificates by verifying its digital signature with the public key associated with the service provider who provided the one passive participant registration certificate, including validating that service provider's active participant registration certificate by verifying its digital signature with the public key associated with the service provider who provided the service provider's active participant registration certificate; and a conference session attendance certificate generating module, for use by computers associated with the certification authorities, for responding to a request by any one of the passive participants for an attendance certificate for the specified conference session by validating the requesting party's passive participant registration certificate and then generating a corresponding conference session attendance certificate.

9. The computer program product of claim 8, wherein the first and second service provider modules include instructions for including in the active participant registration certificates and passive participant registration certificates a copy of a secret key associated with a private conference session that has been encrypted using a public key associated with the respective active or passive participant to whom the respective active/passive registration certificate is provided;

a session encryption module for encrypting at least a portion of the private conference session with the associated secret key;

a session decryption module, for use by a participant, for decrypting the portion of the private conference session transmitted in encrypted form using a copy of the secret key generated by decrypting the encrypted secret key in the participant's participant registration certificate with a private key held by the participant, the private key corresponding to the public key with which the secret key was encrypted.

\* \* \* \* \*